US009686767B2

(12) United States Patent
Deloach et al.

(10) Patent No.: US 9,686,767 B2
(45) Date of Patent: Jun. 20, 2017

(54) DEVICE, METHOD, AND SYSTEM FOR DETERMINING LOCATION

(71) Applicant: QUALCOMM Incorporated, San Diego, CA (US)

(72) Inventors: James Douglass Deloach, Sunnyvale, CA (US); Gaurav Lamba, Sunnyvale, CA (US); Milind Patil, Santa Clara, CA (US); Bruce Everett Wilson, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/076,354

(22) Filed: Mar. 21, 2016

(65) Prior Publication Data

US 2017/0064665 A1 Mar. 2, 2017

Related U.S. Application Data

(60) Provisional application No. 62/209,282, filed on Aug. 24, 2015.

(51) Int. Cl.
*H04M 3/42* (2006.01)
*H04W 64/00* (2009.01)
(Continued)

(52) U.S. Cl.
CPC ........ *H04W 64/00* (2013.01); *G01C 21/3453* (2013.01); *G01C 21/3667* (2013.01); *H04M 1/72572* (2013.01); *H04W 88/02* (2013.01)

(58) Field of Classification Search
CPC . H04W 64/00; H04W 88/02; H04M 1/72572; G01C 21/3453; G01C 21/3667
See application file for complete search history.

(56) References Cited

U.S. PATENT DOCUMENTS 8,412,183 B1 4/2013 Kadous et al.
9,122,708 B2 9/2015 Barrington et al.
(Continued)

FOREIGN PATENT DOCUMENTS

WO 2014074837 A1 5/2014
WO 2014198898 A2 12/2014

OTHER PUBLICATIONS

International Search Report and Written Opinion—PCT/US2016/044591—ISA/EPO—Nov. 7, 2016.

*Primary Examiner* — Ajit Patel
(74) *Attorney, Agent, or Firm* — Kilpatrick Townsend & Stockton LLP

(57) ABSTRACT

Methods, systems, computer-readable media, and apparatuses for determining location are presented. One example method includes obtaining a route comprising an ordered set of waypoints; receiving an indication of traversal of the route beginning at a first waypoint and recording a time associated with the indication; determining location information and time information at a sampling rate; for each subsequent waypoint of the ordered set of waypoints: receiving a signal indicating arrival at a current waypoint of the ordered set of waypoints, determining a time and a ground truth associated with the signal, and determining error information associated with each determined location between the prior waypoint and the current waypoint; and providing the error information to a remote device.

20 Claims, 10 Drawing Sheets

(51) Int. Cl.
*H04M 1/725* (2006.01)
*G01C 21/36* (2006.01)
*G01C 21/34* (2006.01)
*H04W 88/02* (2009.01)

(56) References Cited

U.S. PATENT DOCUMENTS

| | | | |
|---|---|---|---|
| 2012/0303270 A1* | 11/2012 | Su | G01C 21/3415 701/431 |
| 2013/0030931 A1* | 1/2013 | Moshfeghi | G01S 19/48 705/16 |
| 2013/0261961 A1 | 10/2013 | Cardoso, Jr. et al. | |
| 2013/0267260 A1 | 10/2013 | Chao et al. | |
| 2013/0285855 A1* | 10/2013 | Dupray | G01S 19/48 342/451 |
| 2013/0331131 A1* | 12/2013 | Fix | H04W 64/00 455/457 |
| 2013/0332273 A1 | 12/2013 | Gu et al. | |
| 2014/0018095 A1 | 1/2014 | Parvizi et al. | |
| 2014/0172297 A1 | 6/2014 | Lin et al. | |
| 2016/0076899 A1* | 3/2016 | Macneille | G01C 21/3469 701/428 |
| 2016/0212589 A1* | 7/2016 | Cawse | H04W 4/028 |

\* cited by examiner

DEVICE, METHOD, AND SYSTEM FOR DETERMINING LOCATION

CROSS-REFERENCE TO RELATED APPLICATIONS

This application claims the benefit of U.S. Provisional Application No. 62/209,282, filed Aug. 24, 2015, entitled "Device, Method, and System for Determining Location", which is assigned to the assignee hereof and which is incorporated herein by reference.

BACKGROUND

Determining ground truth in an indoor scenario is typically accomplished with survey equipment and is time consuming and expensive. Obtaining accurate and pervasive measurements of ground truth is useful for establishing reference points for indoor position determining technologies.

BRIEF SUMMARY

Various examples are described for determining location. For example, one disclosed method includes obtaining a route comprising an ordered set of waypoints; receiving an indication of traversal of the route beginning at a first waypoint and recording a time associated with the indication; determining location information and time information at a sampling rate; for each subsequent waypoint of the ordered set of waypoints: receiving a signal indicating arrival of at a current waypoint of the ordered set of waypoints, determining a time and a ground truth associated with the signal, and determining error information associated with each determined location between the prior waypoint and the current waypoint; and providing the error information to a remote device.

In another example, a disclosed system includes a non-transitory computer-readable medium; and a processor in communication with the non-transitory computer-readable medium, the processor configured to: obtain a route comprising an ordered set of waypoints; receive an indication of traversal of the route beginning at a first waypoint and recording a time associated with the indication; determine location information and time information at a sampling rate; for each subsequent waypoint of the ordered set of waypoints: receive a signal indicating arrival of at a current waypoint of the ordered set of waypoints, determine a time and a ground truth associated with the signal, and determine error information associated with each determined location between the prior waypoint and the current waypoint; and provide the error information to a remote device.

A further example system includes means for obtaining a route comprising an ordered set of waypoints; means for receiving an indication of traversal of the route beginning at a first waypoint and recording a time associated with the indication, means for determining location information and time information at a sampling rate; means for receiving a signal indicating arrival of at a current waypoint of the ordered set of waypoints; means for determining a time associated with the signal; means for determining a ground truth associated with the signal; means for determining error information associated with each determined location between the prior waypoint and the current waypoint; and means for providing the error information to a remote device.

One example non-transitory computer readable medium comprises executable instructions configured to cause a processor to: obtain a route comprising an ordered set of waypoints; receive an indication of traversal of the route beginning at a first waypoint and recording a time associated with the indication; determine location information and time information at a sampling rate; for each subsequent waypoint of the ordered set of waypoints: receive a signal indicating arrival of at a current waypoint of the ordered set of waypoints, determine a time and a ground truth associated with the signal, and determine error information associated with each determined location between the prior waypoint and the current waypoint; and provide the error information to a remote device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
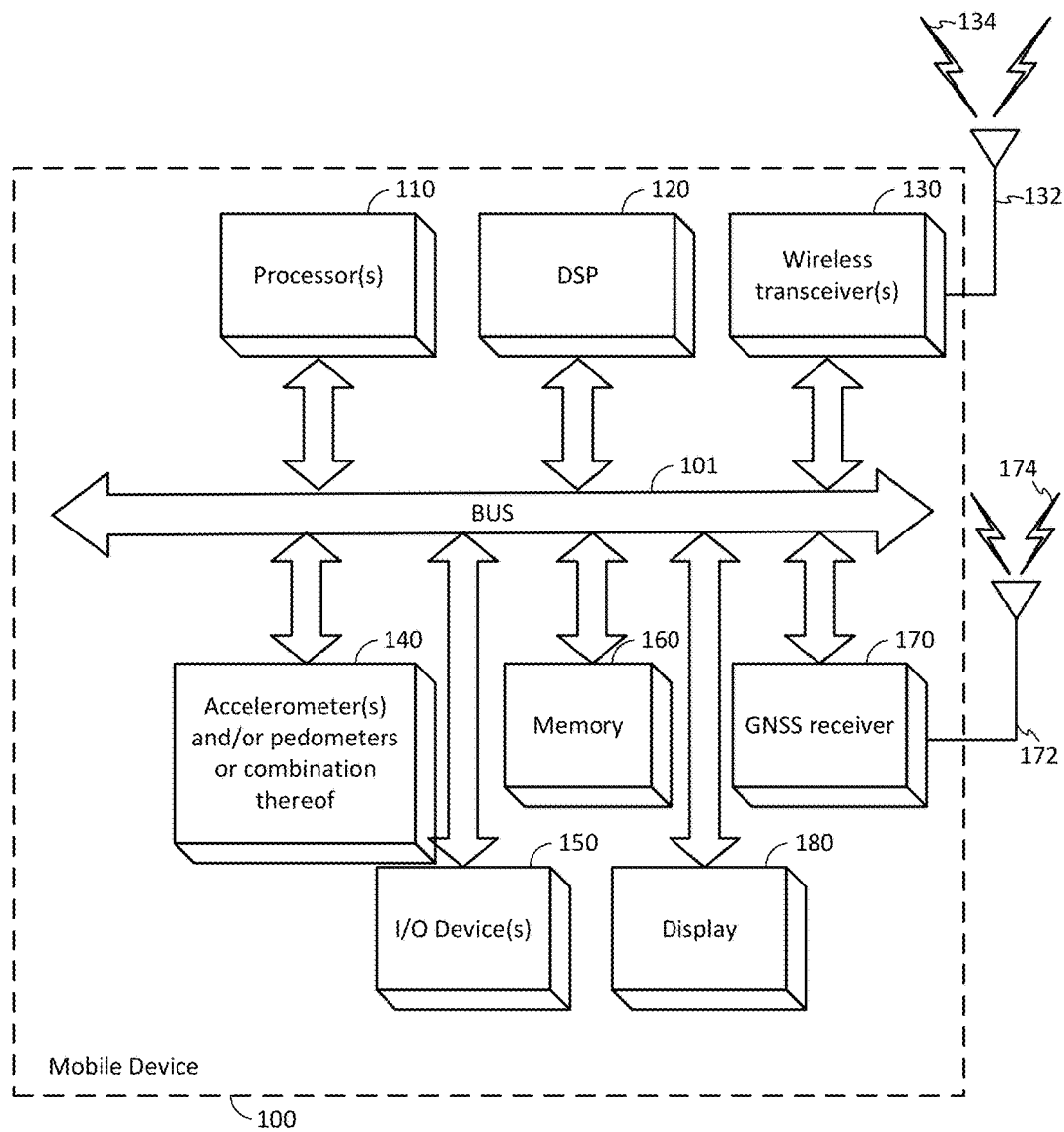
FIG. 1 shows an example computing device for determining location according to this disclosure.

Examples are described herein in the context of devices, methods, and systems for determining location. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

One problem with determining a user's location using positioning technologies is the accuracy of the location determination, particularly in an indoor environment. To determine the accuracy of a location determination, it can be compared to an independently-determined accurate location reference, referred to as "ground truth." For example, an outdoor location may be surveyed to establish ground truth at various points within a region. Certain satellite location-ing systems can also provide highly-accurate position information, such as Global Positioning System (GPS) and other Global Navigation Satellite Systems (GNSS) that can serve as ground truth in some situations. However, signals from such GPS or GNSS systems can degrade and provide inaccurate location information when received indoors.

In an indoor setting, other locationing systems may be used instead of these satellite-based systems, such as cell-based positioning technologies, including ranging-based positioning including LTE's Observed Time Difference of Arrival (OTDOA), centroid based positioning, weighted observability solutions, and hybrids of all of the above, WiFi-based positioning technologies, BTLE, and beacons, sensor-based positioning technologies, including pedestrian dead reasoning. However, these technologies generally require ground truth references to provide accurate location. To provide the ground truth references can be a laborious process that can involve manually measuring and entering surveyed location information, or manually obtaining the information from building maps. In many settings, however, such information is not available.

To obtain ground truth information usable to enable locationing services in an indoor setting in one illustrative example, a user may use a mobile device, such as a smartphone, to access a route to traverse through a building or the floor of a building. In this example, the route includes a number of ordered waypoints and a path to follow between each waypoint. The route is presented to the user on the screen of her smartphone along with a "start" button. When the user arrives at the first waypoint and is ready to traverse the route, she presses the start button and begins to walk along the route, guided by a graphical display of her progress on the screen of her smartphone.

As she walks along the route, the smartphone periodically determines its location based on whatever locationing capabilities are available to it, such as via WiFi, and records the determined location and a time at which the location information was sampled. When the user arrives at the next waypoint, she taps a button on the smartphone's screen to indicate that she has arrived at the waypoint. In this case, rather than stopping at the waypoint, she passes through the waypoint and continues walking along the route, and presses a button indicating that she is only transiting the waypoint rather than stopping. As she continues to traverse the route and reach successive waypoints, her smartphone continues to determine its location and corresponding timestamp along the route.

After reaching each successive waypoint, the smartphone accesses ground truth information for the waypoint and uses linear interpolation along the route based on the waypoint's ground truths and the user's travel speed, which is assumed to be essentially constant along the route between any two waypoints. The linearly-interpolated positions are then compared against corresponding positions determined by the smartphone during traversal of the route. The position error between the measured and interpolated positions is determined for each measured position and stored. After the user has reached the final waypoint, the smartphone completes the error determinations for the route, and provides the error information to a remote server that may use the error information to generate locationing assistance information, such as heatmap information indicating WiFi positioning error within the location. Such information may be provided to other users within the environment and used by the users' devices to correct locations determined based on WiFi signals, and thus provide more accurate location information to the user.

This illustrative example is provided not to limit or define the scope of this disclosure, but rather to provide an example to aid understanding thereof. Further disclosure of example devices, methods, and systems for determining location is provided below.

Referring now to FIG. 1, in certain implementations, for example as illustrated in FIG. 1, a mobile device 100 may contain a wireless transceiver 130 which is capable of sending and receiving wireless signals 134 via a wireless antenna 132 over a wireless network and connected to a bus 101. Some examples may have multiple wireless transceivers 130 and wireless antennas 132 to support multiple standards such as WiFi, CDMA, WCDMA, GSM, LTE and Bluetooth. Wireless transceiver 130, can include without limitation a modem, a network card, an infrared communication device, a wireless communication device, and/or a chipset (such as a Bluetooth™ device, an IEEE 802.11 device (e.g., a device utilizing one or more of the 802.11 standards described herein), an IEEE 802.15.4 device, a WiFi device, a WiMax device, cellular communication facilities, etc.), and/or the like. The wireless communication interface 830 may permit data to be exchanged with a network, wireless access points, other computer systems, and/or any other electronic devices described herein, such as the configuration of FIG. 1. The communication can be carried out via one or more wireless communication antenna(s) 132 that send and/or receive wireless signals 134.

Wireless communication interface 130 can include separate transceivers to communicate with base transceiver stations and other wireless devices and access points, which may include communicating with different data networks and/or network types. A wireless wide-area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 100 can further include various sensor(s). Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 840 can be utilized, among other things, for dead reckoning and/or other positioning methods. Such positioning methods may be used to determine a location of the wireless device 800, and may utilize and/or complement the RTT values obtained using the techniques described herein.

Also illustrated in FIG. 1, certain examples of mobile device 100 may contain a Satellite Positioning System (SPS) receiver 170 capable of receiving Satellite Positioning System (SPS) signals 174 via SPS antenna 172. SPS receiver 170 may also process, in whole or in part, the Satellite Positioning System (SPS) signals 174 and use the SPS signals 174 to determine the location of the mobile device. In some examples, general-purpose processor(s) 110, memory 160, DSP(s) 120 and specialized processors (not shown) may also be utilized to process the SPS signals 174, in whole or in part, and/or calculate the location of the mobile device 100, in conjunction with SPS receiver 170 The storage of SPS or other location signals may be done in memory 160 or registers. Such positioning can be utilized to complement and/or incorporate the techniques for calculating RTT described herein. The GNSS receiver 170 can extract a position of the mobile device, using conventional techniques, from satellite positioning system satellite vehicles (SVs) of an GNSS or SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 170 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Also illustrated in FIG. 1, certain examples of mobile device 100 may contain one or more I/O Devices 150 such as, but not limited to keypads, touchscreens, buttons or combinations thereof. One or more I/O devices 150 may be employed by a user of the mobile device 100 to provide one or more input signals to the device, which may be used to activate one or more operating modes of the device, to provide inputs in one or more such operating modes, or for other application-specific purposes.

Also illustrated in FIG. 1, certain examples of mobile device 100 may contain accelerometer(s), pedometers, or other motion sensing devices or combinations thereof, as may be implemented to detect footsteps, stride length, timing of steps and other movement-related information or combinations thereof.

Also illustrated in FIG. 1, certain examples of mobile device 100 may contain a Display 180, for example, but not limited to touchscreens, LED displays, LCD displays and other graphical and/or textual displays for output out graphical and/or textual information, such as in a graphical user interface, and, in some cases, for input of information, such as that received from a touch screen display.

Also shown in FIG. 1, mobile device 100 may contain DSP(s) 120, general or special purpose processor(s) 110 and memory 160. In various examples, functions may implemented utilizing various combinations of hardware and software, for example, including one or more instructions or code in memory 160 such as on a computer-readable storage medium, such as RAM, ROM, FLASH, or disc drive, and executed by general or special purpose processor(s) 110, or DSP(s) 120, dedicated hardware such as PLAs, custom hardware, sensors, input and output devices, transceivers and other components of Mobile Device 100. Memory 160 is a processor-readable memory and/or a computer-readable memory that stores software code (programming code, instructions, etc.) configured to cause the processor(s) 110 and/or DSP(s) 120 to perform functions described. In various examples, functions may be performed in hardware.

As shown in FIG. 1, the memory 160 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 160 of the mobile device 100 also can comprise software elements (not shown), including an operating system, device drivers, executable libraries, and/or other code, such as one or more application programs, which may comprise computer programs provided by various examples, and/or may be designed to implement methods, and/or configure systems, provided by other examples, as described herein. Merely by way of example, one or more procedures described with respect to the functionality discussed above, such as the methods shown in FIGS. 6 and/or 7 might be implemented as code and/or instructions executable by the mobile device 100, a processing unit within a mobile device 100, and/or another device of a wireless system. In an aspect, then, such code and/or instructions can be used to configure and/or adapt a general purpose computer (or other device) to perform one or more operations in accordance with the described methods.

Figure 2:
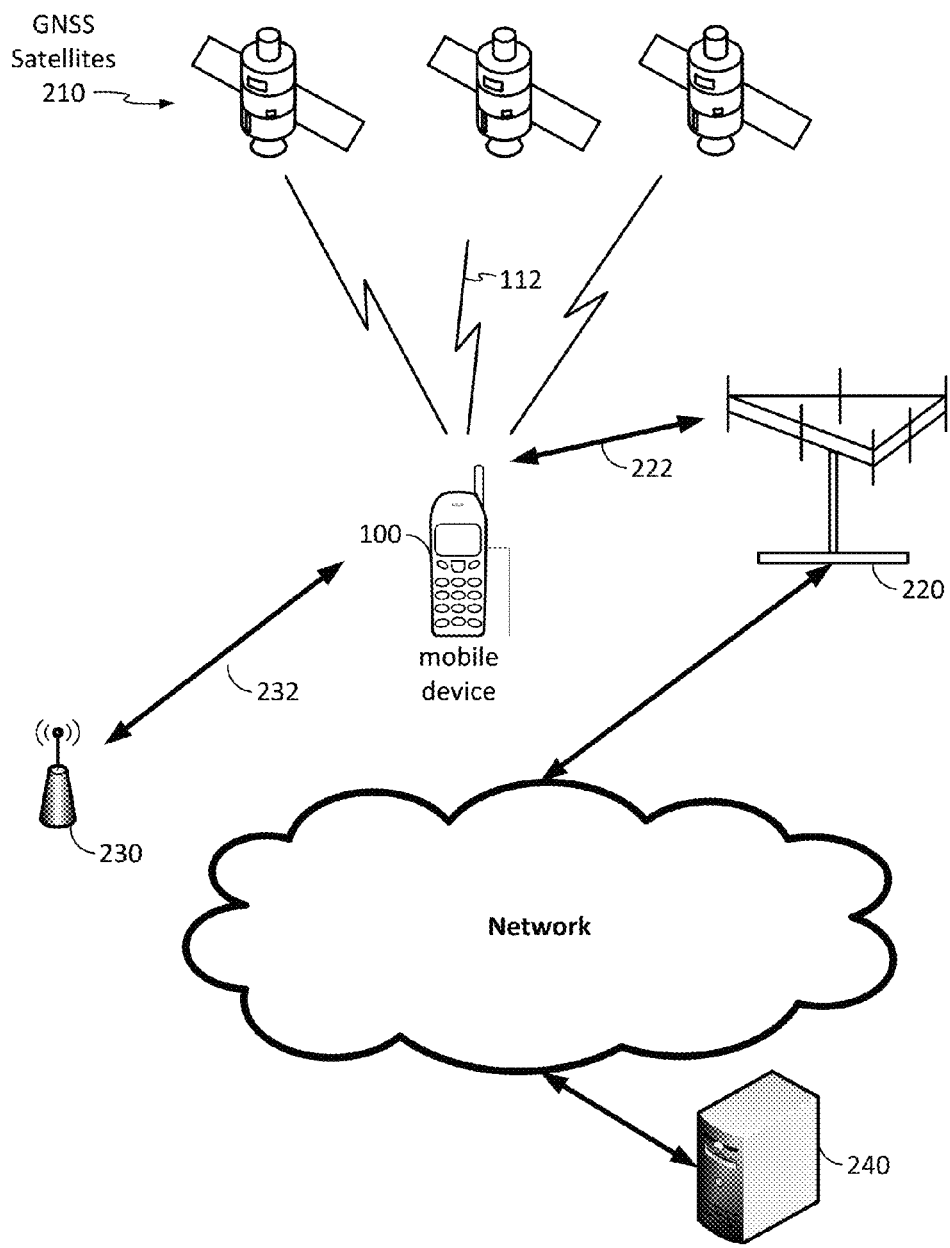
FIG. 2 shows an example system for determining location according to this disclosure.

FIG. 2 illustrates a system diagram for mobile device 100 to determine location and/or ground truth. System 200 may include a server 240 for receiving and recording location data and/or for providing or receiving route and waypoint information. In an example, mobile device 100 may be connected to server 240 via wireless and/or wireless means including WAN, WLAN, LAN, Internet or other means. In an example, mobile device 100 may receive input from GNSS satellites 210 with satellite signals 112 to determine location or wireless signals from access points 230, base transceiver stations (BTS) 220, Bluetooth transceivers or other terrestrial transceivers. In an example, mobile device 100 may communicate with server 240 or with other devices using access points 230, base transceiver stations (BTS) 220, Bluetooth transceivers or other terrestrial transceivers.

Figure 3:
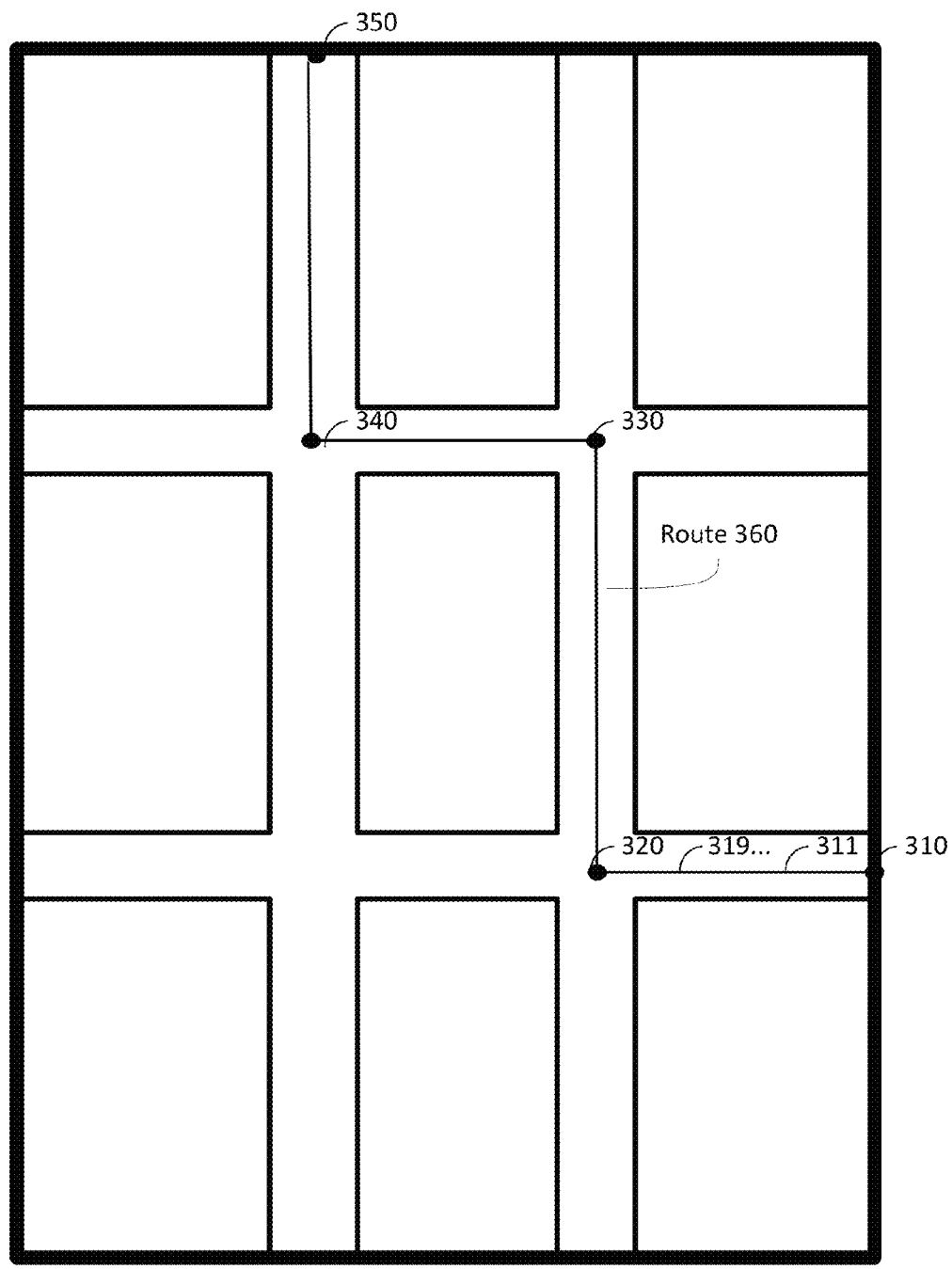
FIG. 3 shows an example map a route having a plurality of waypoints according to this disclosure.

Referring now to FIG. 3, FIG. 3 is an illustration of an example route 360. The route 360 comprises a set of ordered waypoints 310, 320, 330, 340, 350. In this example, waypoint 310 is the first waypoint, followed by waypoint 320, and so forth, with waypoint 350 being the final waypoint within the set. Also shown in FIG. 3 are subpoints 311-319. In this example, the subpoints 311-319 are not elements of the set of waypoints, but rather represent sampled subpoints along the route 360 between waypoints 310 and 320. As described above, in some examples, a user may traverse the route 360 from waypoint to waypoint, in order, while carrying a suitable computing device, such as mobile device 100 of FIG. 1. The device may track its progress along the route 360 and record its own determined location at a sampling rate along with a corresponding time. The mobile device may also record times at each of the waypoints within the set of waypoints. After obtaining times for two successive waypoints, such as waypoints 310 and 320, the device may determine ground truth positions for subpoints 311-319 based on linear interpolation using the ground truth locations of waypoints 310 and 320 and using the recorded time at each of waypoints 310 and 320.

The interpolated ground truths for the subpoints are then compared against the mobile device's determined locations and times for the subpoints to generate error information. While in the foregoing example, the subpoints are identified as subpoints 311-319, the number of subpoints between two waypoints is not limited. For example, as discussed above, a user may employ a pedometer to measure steps taken, which may be used to generate one or more subpoints. In such an example, a number of subpoints between two waypoints may vary depending on the length of a user's stride. In some examples, a number of subpoints may be determined based on a pre-selected sampling rate. For example, if times T1 and T2 are recorded waypoints 310 and 320, respectively, the device may generate subpoints corresponding to locations along the route at intervals of 0.25 seconds of travel. Thus, if the time difference between T1 and T2 is 10 seconds, a number of subpoints may be based on the 0.25 second intervals.

Figure 4:
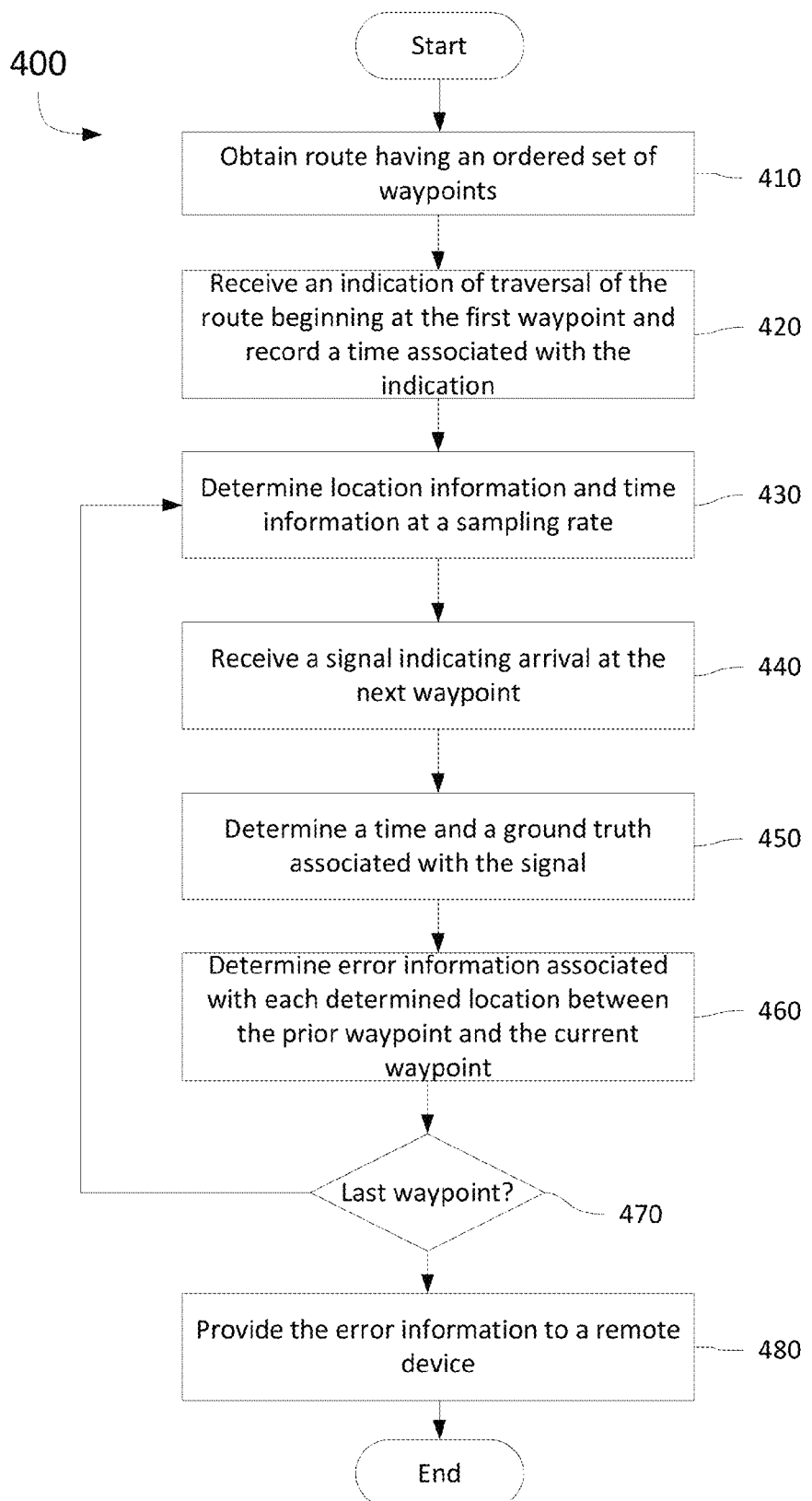
FIG. 4 shows a flow diagram illustrating an example method to determine location according to this disclosure.

Referring now to FIG. 4, FIG. 4 shows a flow diagram illustrating an example method to determine location according to this disclosure. The method 400 of FIG. 4 is discussed with respect to the mobile device 100 of FIG. 1, though it is not limited to such a device. Instead, any suitable device may be employed.

The method of FIG. 4 begins at block 410 when the mobile device 100 obtains a route comprising an ordered set of waypoints. As discussed above, the route may be obtained in any suitable way, such as via a wired or wireless communications link, from a computer-readable storage medium within or in communication with the mobile device 100, or may be entered by a user. In some examples, the mobile device 100 may receive a set of ground truths for a location and may establish one or more waypoints corresponding to the ground truths. The mobile device 100 may also establish one or more routes that traverses two or more of the waypoints. For example, the mobile device 100 may employ an algorithm to solve the travelling salesman problem to establish a route. While an optimal solution to the travelling salesman problem for a given set of waypoints may be computationally difficult to obtain, one or more approximation algorithms may be employed instead to obtain a reasonably optimal route to traverse the waypoints. These or other means for obtaining a route comprising an ordered set of waypoints may be employed in one or more example systems or devices according to this disclosure.

Figure 6:
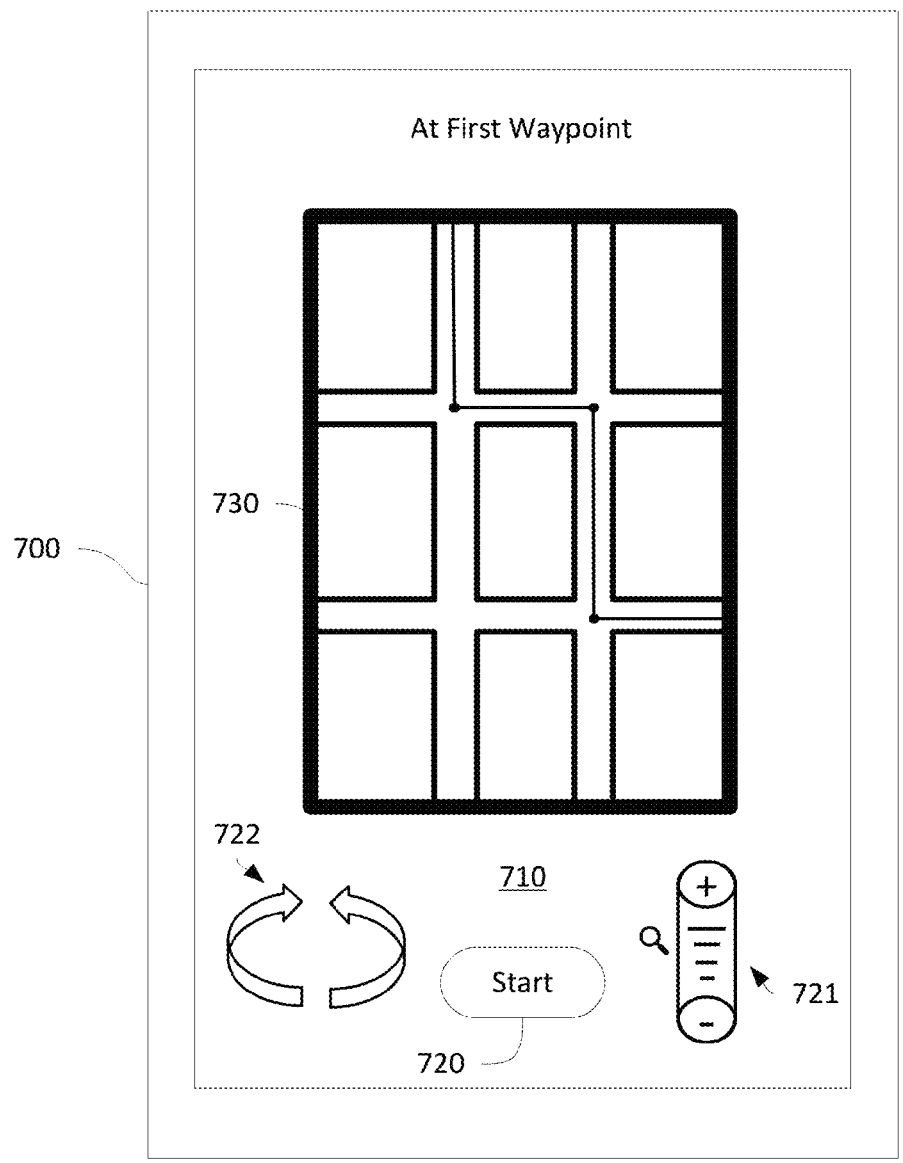
FIGS. 6-8 show example graphical user interfaces for devices, methods, and systems for determining location according to this disclosure.

At block 420, the mobile device 100 receives an indication of traversal of the route beginning at the first waypoint, and records a time associated with the indication. For example, a user may be presented with a graphical user interface (GUI) on her smartphone that shows an overview of a route to be traversed, such as the route shown in FIG. 3, and waypoints on the route, and may also include one or more user interface elements (whether physical or virtual), such as buttons, icons, menus, scrolling lists, scroll bars, slider controls, etc., for interacting with the GUI. For example, FIG. 6 shows an example GUI presented on display 710 of a smartphone 700. The GUI presents an overview of the route 730 to be traversed, and provides a "Start" button 720 that the user may press when she is ready to begin traversing the route. When the user presses the "Start" button 720, an indication of traversal of the route beginning at the first point is received by the smartphone 700. In this example, the "Start" button 720 is only enabled when the user is at the first waypoint at the route, though in other examples, the "Start" button 720 may be enabled and usable wherever the user is located, but may only cause the indication to be provided once the user arrives at the first waypoint. In some examples, the user may forget to press the start button and instead simply begin to traverse the route. The mobile device 100 may determine that it has traversed a location corresponding to the first waypoint and may determine that the route is being followed, and may thus generate an output that is received as an indication of traversal of the route beginning at the first waypoint, and records a time associated with the indication. Still other means for receiving an indication of traversal of the route beginning at the first waypoint, and recording a time associated with the indication may be employed in further examples.

At block 430, the mobile device 100 begins determining its position at a sampling rate. For example, the mobile device 100 be configured to determine its position at a rate of 1 Hz while it is traversing the route. Other examples may employ different sampling rates, such as sampling rates greater than 1/20 Hz. In some examples, the mobile device 100 may determine its position based on detected events, such as footsteps detected by an accelerometer or a pedometer, or for every revolution of a wheel on a cart or other wheeled implement. In some examples, the mobile device 100 may determine its position at a rate based on a user input, such as a user pressing a button or touching an icon on a touch screen. In this example, the mobile device 100 continues to determine its position at its sampling rate until the mobile device 100 arrives at a next waypoint. However, in some examples, the mobile device 100 may interrupt its position determinations if it detects it has stopped moving, and restart position determination upon determining it has begun moving again. For example, a user may press a physical button or touch a virtual button or an icon on a touch-sensitive display to indicate that the user has paused along the route, or the mobile device 100 may determine, such as based on a pedometer, accelerometer, rotary encoder, relatively static position (e.g., stays within approximately a 1- to 2-meter radius) over a period of time (e.g., at least a few seconds) etc., that it has stopped moving. The mobile device 100 may resume determining its position according to its sampling rate upon detecting that movement has resumed, again, such as based on a pedometer, accelerometer, rotary encoder, or detecting a change in position along a direction of travel.

In addition to determining its position, the mobile device 100 also determines a time associated with at least some of the determined positions. For example, the mobile device 100 may record a time stamp for each determined position, or for location determinations made at a predetermined interval, such as every second, even if other location determinations are made at a faster or different rate. A time stamp may be based on a local clock maintained within the device, a time provided by a network, such as a cellular network, or through the use of a timing protocol, such as the network time protocol.

At block 440, the mobile device 100 receives a signal indicating arrival at the next waypoint of the ordered set of waypoints. For example, as discussed above, a user may cause a signal to be provided to the mobile device 100 via a user interface, for example, by pushing a button on the mobile device 100, or by touching a user interface element within a GUI displayed on a touch-sensitive input device when each waypoint on the route is departed from, arrived at, or traversed without stopping or combination thereof. In some examples, the mobile device 100 may receive a signal from a sensor within the mobile device 100 based upon a determined proximity to a waypoint of the ordered set of waypoints. For example, a QR code or other visual reference point, or a beacon, such as a Bluetooth beacon, may be present at one or more of the waypoints that may be detected by one or more sensors of the mobile device 100.

In some examples, the mobile device 100 may receive a plurality of signals while traversing the route, such as signals from one or more user inputs or based on one or more sensor signals. For example, a first signal may indicate arrival at the respective waypoint and a second signal may indicate departure from the respective waypoint. In one example, a user may press a user interface element, such as button 727 shown in FIG. 8, indicating arrival at a waypoint, or, as discussed above, the mobile device 100 may receive one or more sensor signals indicating arrival at a waypoint. At a later time, the user may engage a user interface element to indicate departure from the waypoint, such as button 725 shown in FIG. 8, or one or more sensor signals may indicate that the mobile device 100 has departed the waypoint. For example, a sensor signal may indicate increasing distance from a beacon, or loss of signal from the beacon. Such a feature may enable pauses at locations, such as to indicate arrival while allowing the mobile device 100 to scan information about the waypoint, such as a QR code or other encoded information indicating a ground truth location of the waypoint, or to determine the direction to take for the next segment of the route. Once the user is ready to resume travel along the route, the user may, for example, press a button or touch an icon on a touch screen to indicate the user has resumed travel and is departing from the waypoint.

In addition, the mobile device 100 determines a time and a waypoint associated with the received signal. For example, the mobile device 100 may record a time stamp based on a local clock maintained within the device, or a time provided by a network, such as a cellular network, or through the use of a timing protocol, such as the network time protocol.

In one example, the mobile device 100 may determine a waypoint of the ordered set of waypoints associated with the received signal. For example, the device may associate the first received signal with the first waypoint of the ordered set of waypoints. Subsequent received signals may then be associated with successive waypoints of the ordered set of waypoints in sequence. In some examples, the signal may include an indication of which waypoint the signal is associated. For example, as discussed above, a sensor on the mobile device 100 may detect an arrival at one of the waypoints of the ordered set of waypoints and generate and output a signal indicating the arrival of the mobile device 100 as well as an indication of the waypoint. After determining which waypoint the signal is associated, the mobile device obtains the ground truth location of the waypoint. For example, the ordered set of waypoints may include ground truth locations for each waypoint within the ordered set and the mobile device 100 may obtain the ground truth location for the waypoint from the ordered set. In some examples, the mobile device 100 may transmit a request for a ground truth location to a remote device and receive, in response, a ground truth location for the waypoint. In some examples, the mobile device 100 may obtain a ground truth location for a waypoint based on a sensor signal. For example, as discussed above, the device may scan a QR code upon arriving at a location, which may include an identifier for the waypoint and a ground truth location for the waypoint. In some examples, the mobile device 100 may obtain a waypoint identifier from a beacon signal, or the user may enter such information using a user interface element (e.g., select from a list, or manually enter a waypoint identifier).

In some examples, a location of a waypoint in the ordered set of waypoints may comprise a coordinate within a set of coordinate axes. For example, each waypoint of the ordered set of waypoints may comprise a latitude and longitude coordinate. Alternatively, in some examples, a coordinate system for a particular floor may be established independently of a "real-world" coordinate system. For example, in one example, the waypoints of the ordered set of waypoints may all be located on the same floor of a building, and a two-dimensional Cartesian coordinate system may be established for the floor and each waypoint of the ordered set of waypoints may comprise an (x, y) coordinate within the two-dimensional Cartesian coordinate system. In some examples, one or both axes may be associated with aisles within a store or within an office building. For example, a retail store may have a plurality of aisles running from the front to the back of the store along a nominal "Y" axis, and a plurality of aisles running the width of the store along a nominal "X" axis. Thus, waypoints of the ordered set of waypoints may correspond to the locations of intersections of aisles, a cash register, etc., within a locally-defined Cartesian coordinate system.

At block 450, the mobile device 100 determines error information based on the determined positions and interpolated ground truths along the route. For example, based on the departure time from one waypoint and the arrival time at the next waypoint, the mobile device 100 can determine an average speed, such as along the route as a whole, between successive pairs of waypoints, etc. The mobile device 100 may then use the determined average velocity to linearly interpolate ground truth positions at each time stamp associated with each determined position and based on ground truth locations of two successive waypoints.

For example, referring to FIG. 3, the mobile device 100 determined its position, e.g., via WiFi positioning techniques, and a corresponding time stamp at each of subpoints 311-319. The mobile device then linearly interpolates, based on the determined average velocity between waypoints 310 and 210 and the times for each determined position, a ground truth corresponding to each determined position. Thus, the mobile device 100 may determine interpolated ground truth positions for each of subpoints 311-319. The mobile device 100 then can determine a difference between the position of each subpoint as determined by the mobile device 100 while traversing the route and the corresponding interpolated ground truth to determine a position error at each subpoint. The mobile device 100 may then calculate position errors for each determined location along the route between the two waypoints.

At block 470, the mobile device 100 determines whether it has reached the last waypoint in the ordered set of waypoints for the route. If there remain additional waypoints to achieve along the route, the method 400 returns to block 430, where the mobile device continues to determine location information and time information as the user traverses the route. In some examples, the mobile device 100 may await an indication that the user has departed from the waypoint before returning to block 430. However, if all waypoints have been traversed, the method 400 proceeds to block 480.

At block 480, the mobile device 100 provides the error information determined in each iteration of block 460. In some examples, the mobile device 100 may transmit the error information to a remote device, such as a remote server or to another mobile device. In some examples, the mobile device 100 may store the error information on a local computer-readable medium, such as to a removable flash drive. The error information may be used to provide more accurate location information to other mobile devices within the environment. For example, the error information may be provided to mobile devices requesting location services in the environment and may be used as correction factors to locations determined by such mobile devices using the same locationing technique used by the mobile device 100 that performed the method 400. Thus, if the mobile device 100 used WiFi positioning, the error information may be usable by other devices using WiFi positioning to correct such WiFi position determinations. Though in some examples, the error information may be usable by a device using any locationing technique.

Figure 5A:
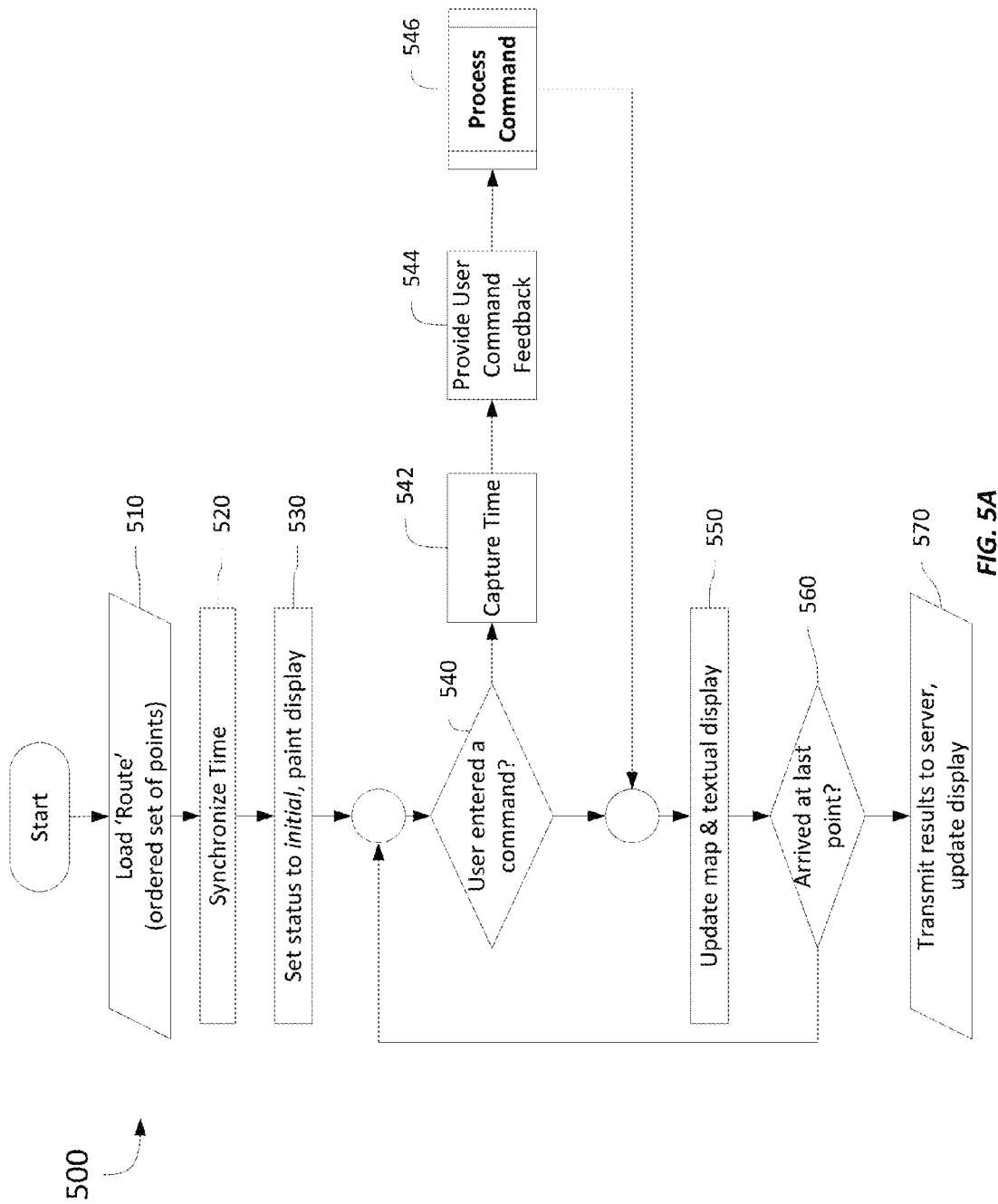
FIGS. 5A-5B show flow diagrams illustrating an example method to determine location according to this disclosure.
Figure 5B:
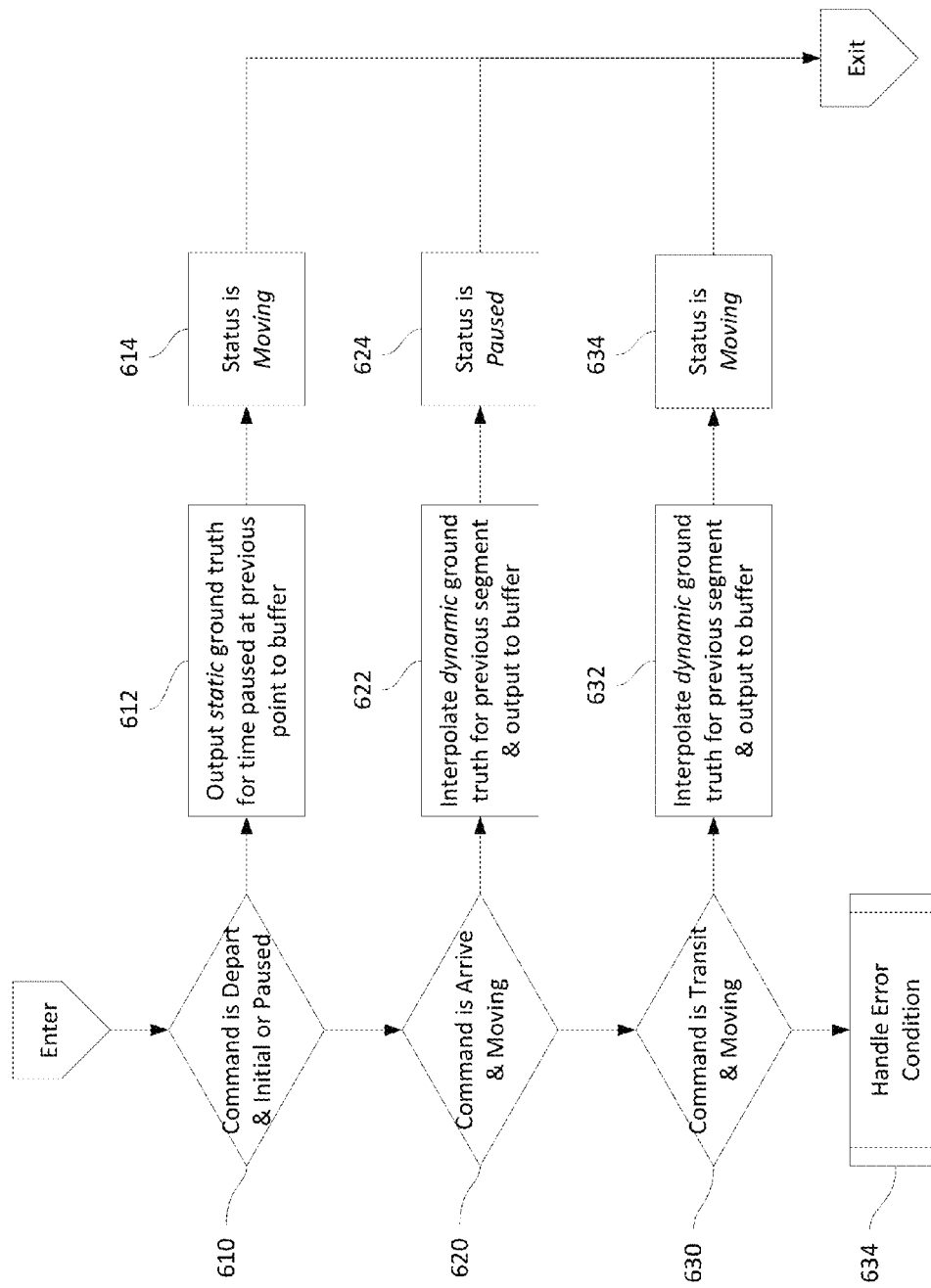

Referring now to FIGS. 5A and 5B, FIGS. 5A and 5B illustrate an example method for determining position. The method 500 of FIGS. 5A-5B is described with reference to the example mobile device 100 shown in FIG. 1, but is not limited to such a mobile device 100. Instead, any suitable device may be employed to perform this or other methods according to this disclosure.

The method 500 of FIGS. 5A-5B begins at block 510 when the mobile device 100 obtains a route comprising an ordered set of waypoints. As discussed above, the route may be obtained in any suitable way, such as via a wired or wireless communications link, from a computer-readable storage medium within or in communication with the mobile device 100, or may be entered by a user.

At block 520, the mobile device 100 synchronizes its time with a known time source, such as based on a local clock maintained within the device, or a time provided by a network, such as a cellular network, or through the use of a timing protocol, such as the network time protocol. For example, the mobile device 100 may synchronize its time with time information received from GPS or GNSS.

At block 530, the mobile device 100 sets a status parameter to "initial" and displays a graphical representation of at least a portion of the route. For example, the mobile device 100 may display a route segment between the initial waypoint and the next waypoint. In some examples, the mobile device 100 may display a graphical representation of the entire route, such as may be seen in FIG. 6, which may include one or more user interface elements to allow the user to zoom 721 or pan 722 the graphical representation of the route.

At block 540, the mobile device 100 determines whether it has received a user input, such as a user input to press the "Start" button shown in FIG. 6. If a user input has been received, the method 500 proceeds to block 542, otherwise, the method 500 proceeds to block 546.

At block 542, the mobile device 100 captures a time associated with the user input. For example, the user input may indicate that the user has arrived at a waypoint, has departed from a waypoint, or has traversed a waypoint without stopping. In some examples, the user input may indicate that the user has paused along the route. In some examples, the user input may be automatically generated by the mobile device 100, such as based on one or more sensors. In one example, the mobile device 100 comprises a sensor configured to detect parameters related to motion of the device, such as an accelerometer, a pedometer, a rotary encoder, a WiFi receiver, or other suitable means. The mobile device 100 may receive a user input based on the user halting movement, which may be detected by one or more sensors as discussed above with respect to the method 400 of FIG. 4.

At block 544, the mobile device 100 provides feedback to the user based on the user input. For example, the mobile device 100 may generate and output a sound, a haptic effect, or a graphical effect based on the user input. In some examples, the mobile device 100 may alter the user interface, such as by adding a button to the user interface, changing an existing button on the user interface, or changing a function of a physical button on the mobile device 100. In some examples, the mobile device 100 may generate and output a haptic effect to indicate to the user that the user input was received or that an error occurred.

At block 546, the mobile device 100 processes a command associated with the user input.

Figure 5C:
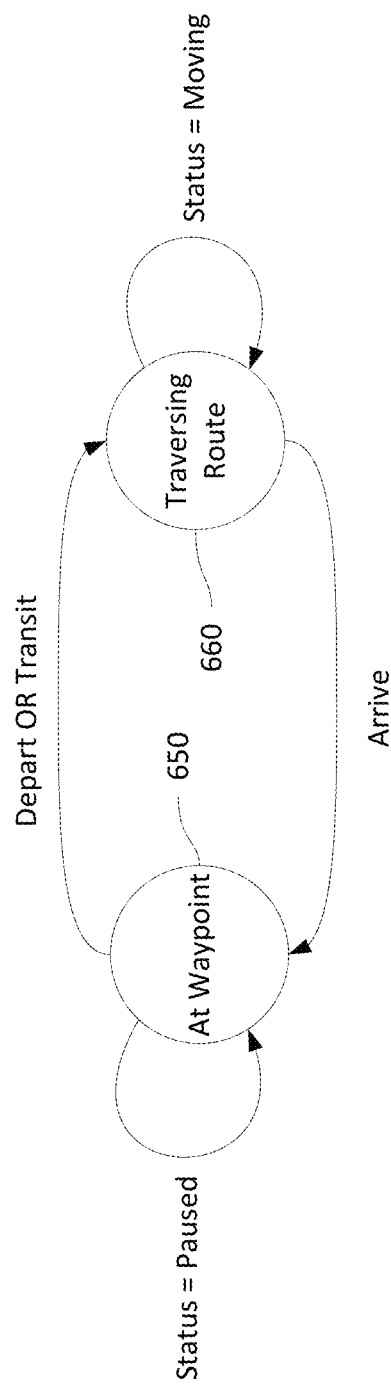
FIG. 5C shows a state diagram based on the example flow diagram of FIG. 5B.

Referring now to FIGS. 5B and 5C, FIG. 5B shows a portion of the method 500 related to block 546 and the method 500 proceeds to block 610, while FIG. 5C shows a state diagram corresponding to the flow diagram of FIG. 5B. Reference will also be made to the example GUI shown in FIG. 8.

Figure 8:
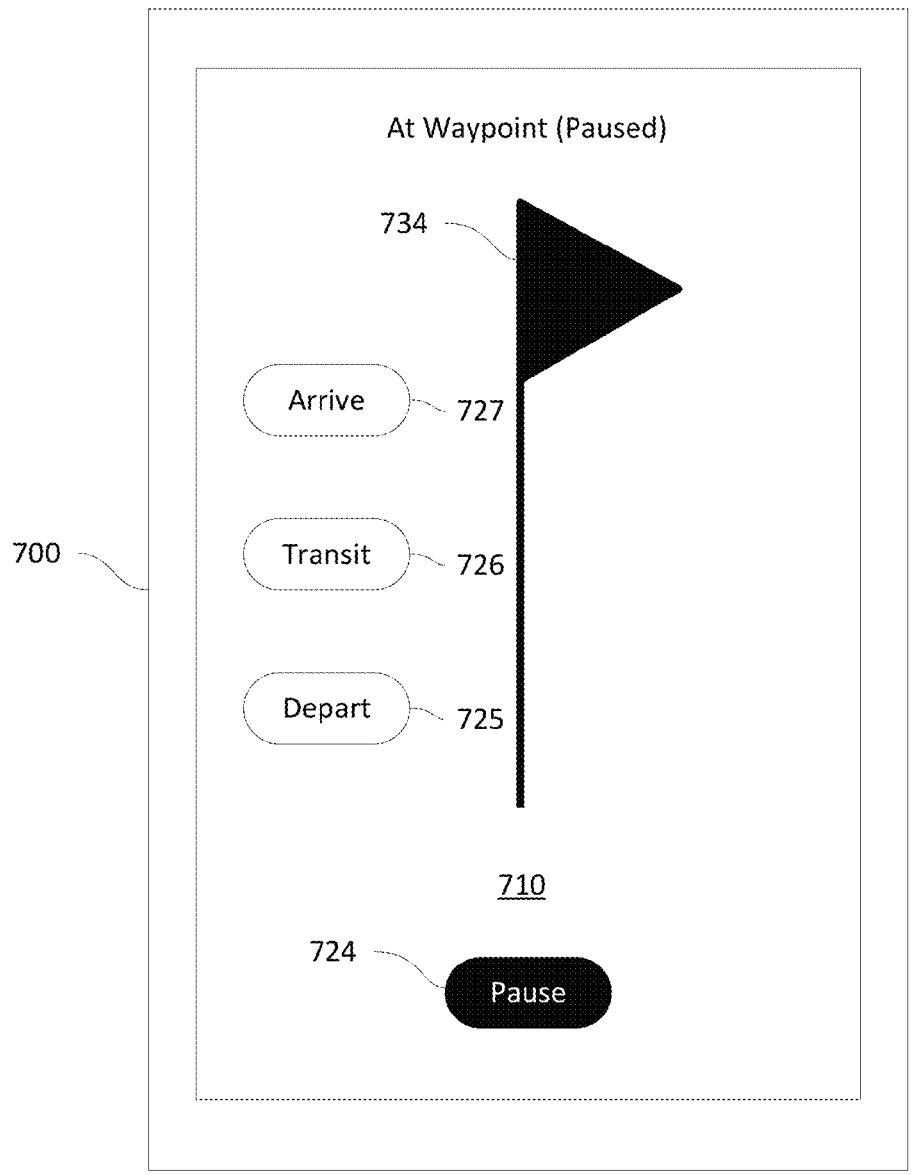

At block 610, the mobile device 100 determines whether the command is a "depart" command and also determines whether the status parameter has a value of "initial" or "paused." For example, referring to FIG. 8, the user, prior to leaving the waypoint 734, may press the "Depart" button 725 while at a waypoint 734 to indicate that the user is leaving the waypoint and proceeding along the route to the next waypoint. If so, the method 500 proceeds to block 612. Otherwise, the method 500 proceeds to block 620.

At block 612, the mobile device outputs the static ground truth for the time at the last waypoint achieved by the mobile device along the route. As discussed above with respect to the method 400 of FIG. 4, waypoints on the route are associated with previously determined ground truths and the ground truth for a waypoint may be obtained in a variety of ways as discussed previously. Thus, in one example, the mobile device 100 outputs the ground truth associated with the waypoint.

At block 614, the device sets the status parameter to "moving," and the method 500 proceeds to block 550 in FIG. 5A.

Figure 7:
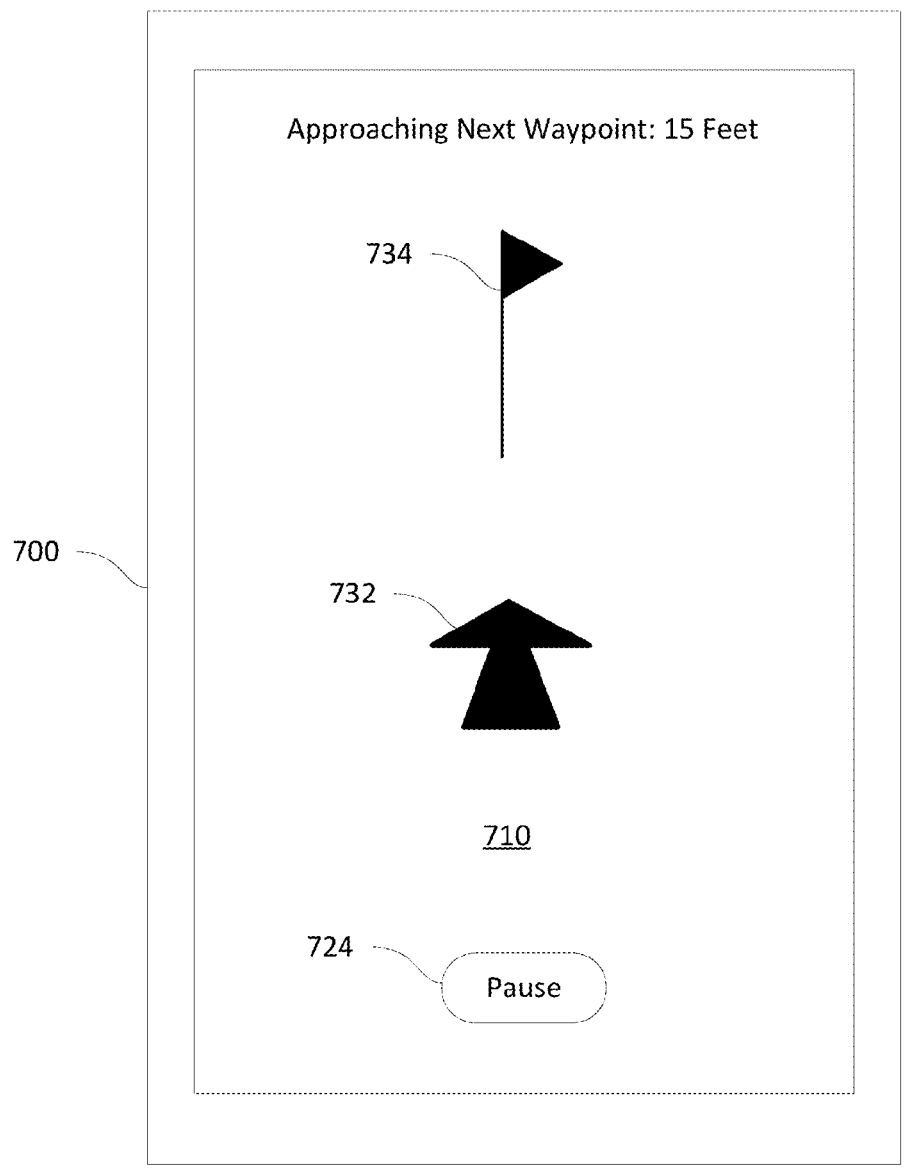

Referring to FIG. 5C, while the mobile device 100 is in the state "At Waypoint" 650, the mobile device may be in the paused state, or in an initial state at the first waypoint. Upon receiving the "Depart" command, as described above, the mobile device 100 transitions to the "Traversing Route" state 660 and determines its location at the sampling rate and obtain corresponding time information as described above. In addition, the GUI displayed on the mobile device's screen 710 may be updated to show progress towards the next waypoint. For example, FIG. 7 shows an example GUI illustrating a user's progress towards a waypoint 734, indicated by an arrow 732 indicating a direction of travel to the waypoint 734, as well as textual information indicating a distance (e.g., 15 feet) to the next waypoint.

At block 620, the device determines whether the command is an "Arrive" command and also determines whether the status parameter has a value of "moving." For example, the user may press the "Arrive" button 727 displayed on the screen to indicate arrival at the waypoint 734. If so, the method 500 proceed to block 622. Otherwise, the method 500 proceeds to block 630.

At block 622, the mobile device 100 interpolates ground truth values for each determined position along the last segment of the route, such as described above with respect to the method 400 of FIG. 4.

At block 624, the device sets the status parameter to "Paused," and the method 500 proceeds to block 550 in FIG. 5A.

Referring again to FIG. 5C, while the mobile device 100 is in the state "Traversing Route" 660, the mobile device may receive an "Arrive" command, as described above. In response to receiving the "Arrive" command, the mobile device 100 transitions to the "At Waypoint" state 650 and sets the status to "Paused" and remains at the "At Waypoint" state 650, either awaiting a "Depart" command or at the conclusion of the route. As may be seen in FIG. 8, the mobile device 100 has paused at the waypoint 734, as indicated by the text at the top of the screen and by the "Pause" button 724 being darkened.

At block 630, the device determines whether the command is a "Transit" command and also determines whether the status parameter has a value of "moving." For example, as the user arrives at the waypoint, she may press the "Transit" button 726 shown in FIG. 8. If so, the method 500 proceed to block 632. Otherwise, the method 500 proceeds to block 634.

At block 632, the mobile device 100 interpolates ground truth values for each determined position along the last segment of the route, such as described above with respect to the method 400 of FIG. 4.

At block 634, the device sets the status parameter to "moving," and the method 500 proceeds to block 550 in FIG. 5A.

Referring again to FIG. 5C, while the mobile device 100 is in the state "Traversing Route" 660, the mobile device may receive an "Transit" command, as described above. In response to receiving the "Transit" command, the mobile device 100 transitions to the "At Waypoint" state 650, but maintains its status as "Moving," and then transitions back to the "Traversing Route" state 660.

At block 550, the mobile device 100 updates the graphical representation of the route map and displays it to the user. For example, the mobile device 100 may update the graphical representation of the route map to show the current progress along the route, or display information relating to one or more waypoints remaining in the route, or one or more waypoints that have already been achieved along the route.

At block 560, the mobile device 100 determines whether it has arrived at the last waypoint in the route. If not, the method 500 returns to block 540. Otherwise, the method 500 proceeds to block 570.

At block 570, the mobile device 100 transmits the error information or other results to a remote server for processing, such as was described above with respect to block 450 of FIG. 4.

After block 570, the method 500 ends.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

What is claimed is:

1. A method of determining location using a mobile device, the method comprising:
   obtaining, by the mobile device, a route comprising an ordered set of waypoints;
   receiving, by the mobile device, an indication of traversal of the route beginning at a first waypoint and recording a time associated with the indication;
   determining, by the mobile device, location information of the mobile device and time information, of the mobile device, at a sampling rate;

for each subsequent waypoint of the ordered set of waypoints:
receiving, by the mobile device, a signal indicating arrival at a current waypoint of the ordered set of waypoints,
determining, by the mobile device, a time and a ground truth associated with the signal, and
determining, by the mobile device, error information associated with each determined location between a prior waypoint and the current waypoint; and
providing, by the mobile device, the error information to a remote device.

2. The method of claim 1, wherein the route further comprises ground truth locations for each waypoint in the ordered set of waypoints.

3. The method of claim 1, further comprising presenting a graphical user interface (GUI) on a display, the GUI comprising a representation of at least a portion of the route.

4. The method of claim 3, wherein the GUI further comprises a user interface element configured to receive a user input and, in response to receiving the user input, provide the indication of traversal of the route.

5. The method of claim 3, wherein the GUI is further configured to provide a visual indication of progress along the route.

6. The method of claim 1, wherein determining the error information comprises using linear interpolation to calculate error information associated with each determined location based on (i) the determined location, (ii) the determined time associated with the respective location, (iii) a time associated with the prior waypoint, (iv) a time associated with the current waypoint, and (v) ground truths associated with the prior and current waypoints.

7. A mobile device for determining location, comprising:
memory;
a wireless transceiver; and
a processor operatively coupled with the memory and the wireless transceiver, the processor configured to:
obtain a route comprising an ordered set of waypoints;
receive an indication of traversal of the route beginning at a first waypoint and recording a time associated with the indication;
determine location information of the mobile device, and time information, of the mobile device, at a sampling rate;
for each subsequent waypoint of the ordered set of waypoints:
receive, at the mobile device, a signal indicating arrival at a current waypoint of the ordered set of waypoints,
determine a time and a ground truth associated with the signal, and
determine error information associated with each determined location between a prior waypoint and the current waypoint; and
provide the error information to a remote device.

8. The mobile device of claim 7, wherein the route further comprises ground truth locations for each waypoint in the ordered set of waypoints.

9. The mobile device of claim 7, wherein the processor is configured to cause a display to present a graphical user interface (GUI) on the display, the GUI comprising a representation of at least a portion of the route.

10. The mobile device of claim 9, wherein the GUI further comprises a user interface element configured to receive a user input and, in response to receipt of the user input, provide the indication of traversal of the route.

11. The mobile device of claim 9, wherein the GUI is further configured to provide a visual indication of progress along the route.

12. The mobile device of claim 7, further comprising a user input device configured to receive a user input.

13. The mobile device of claim 12, wherein the indication of traversal of the route or the signal indicating arrival at the current waypoint is based on receipt of the user input.

14. The mobile device of claim 7, wherein the processor is configured to use linear interpolation to calculate error information associated with each determined location based on (i) the determined location, (ii) the determined time associated with the respective location, (iii) a time associated with the prior waypoint, (iv) a time associated with the current waypoint, and (v) ground truths associated with the prior and current waypoints.

15. A mobile device for determining location, comprising:
means for obtaining a route comprising an ordered set of waypoints;
means for receiving an indication of traversal of the route beginning at a first waypoint and recording a time associated with the indication,
means for determining location information of the mobile device and time information, of the mobile device, at a sampling rate;
means for receiving, at the mobile device, a signal indicating arrival at a current waypoint of the ordered set of waypoints;
means for determining a time associated with the signal;
means for determining a ground truth associated with the signal;
means for determining error information associated with each determined location between a prior waypoint and the current waypoint; and
means for providing the error information to a remote device.

16. The mobile device of claim 15, wherein the route further comprises ground truth locations for each waypoint in the ordered set of waypoints.

17. The mobile device of claim 15, further comprising means for presenting a graphical user interface (GUI) on a display, the GUI comprising a representation of at least a portion of the route.

18. The mobile device of claim 17, wherein the GUI further comprises means for receiving a user input and, in response to receiving the user input, providing the indication of traversal of the route.

19. The mobile device of claim 17, wherein the GUI further comprises means for providing a visual indication of progress along the route.

20. The mobile device of claim 15, wherein the means for determining the location comprises means for using linear interpolation to calculate error information associated with each determined location based on (i) the determined location, (ii) the determined time associated with the respective location, (iii) a time associated with the prior waypoint, (iv) a time associated with the current waypoint, and (v) ground truths associated with the prior and current waypoints.

* * * * *